United States Patent [19]

Sautter, Jr.

[11] Patent Number: 5,284,378
[45] Date of Patent: Feb. 8, 1994

[54] SELF-STORING CONVERTIBLE TOP LATCH SYSTEM

[75] Inventor: Robert H. Sautter, Jr., Brooklyn, Mich.

[73] Assignee: Wickes Manufacturing Company, Charlotte, N.C.

[21] Appl. No.: 977,096

[22] Filed: Nov. 16, 1992

[51] Int. Cl.$^5$ ............................................. B60J 7/185
[52] U.S. Cl. .............................. 296/224; 292/DIG. 5
[58] Field of Search .................. 296/224, 121, 120.1, 296/107, 116, 117, 128; 292/DIG. 5

[56] References Cited

U.S. PATENT DOCUMENTS

| | | | |
|---|---|---|---|
| 2,486,905 | 11/1949 | Ackermans | 296/120 |
| 2,560,459 | 7/1951 | Lundberg et al. | 296/120 |
| 2,570,260 | 10/1951 | Milhan | 296/120 |
| 2,993,731 | 7/1961 | Miles, Jr. | 296/120 |
| 3,216,763 | 11/1965 | Heincelman | 296/121 |
| 3,266,838 | 8/1966 | Heincelman | 296/121 |
| 3,348,876 | 10/1967 | Pollak et al. | 296/121 |
| 4,664,436 | 5/1987 | Eyb | 296/121 |
| 5,042,869 | 8/1991 | Brin | 296/121 |

*Primary Examiner*—Robert R. Song
*Attorney, Agent, or Firm*—David A. Greenlee

[57] ABSTRACT

A latch mechanism for latching a convertible top header to a vehicle windshield header comprises a latch hook receiver mounted adjacent to each end of the windshield header and a pair of movable latch members each having a free end mounting a hook. A mounting bracket located adjacent to each end of the top header has an elongated base slot and an intersecting curvilinear branch slot adjacent to its outer end. A guide pin and a spaced drive pin are carried by each latch member. The guide pin is received within the base slot and the drive pin is received within the branch slot in the unlatched position. A drive link is connected to each latch member drive pin. Operation of the drive link pivots the latch members about the guide pins until the drive pins enter the base slots and terminally slide both pins toward the inner ends of the base slots to move the latch members from unlatched to latched positions. This moves each hook through a compound curvilinear path between an unlatched position stored within the top header, and a latched position, extending from the top header. In one embodiment, an electric motor is mounted centrally of the top header and is connected to each drive link by a power transmission. In another embodiment, a manual operator mounted centrally of the top header is connected to each drive link by a linkage which includes an overcenter device for locking the latch members in a latched position.

15 Claims, 5 Drawing Sheets

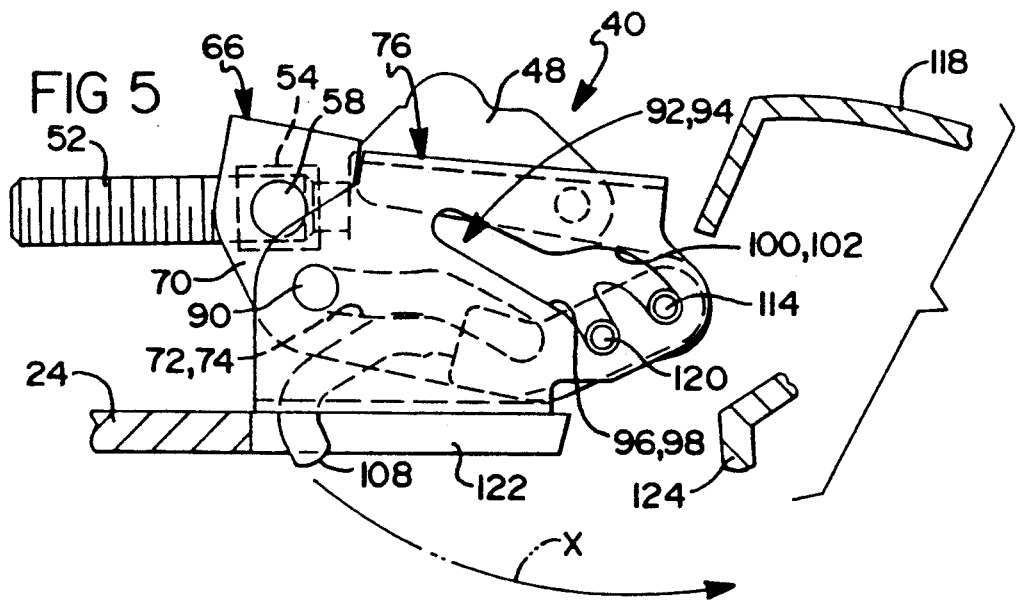
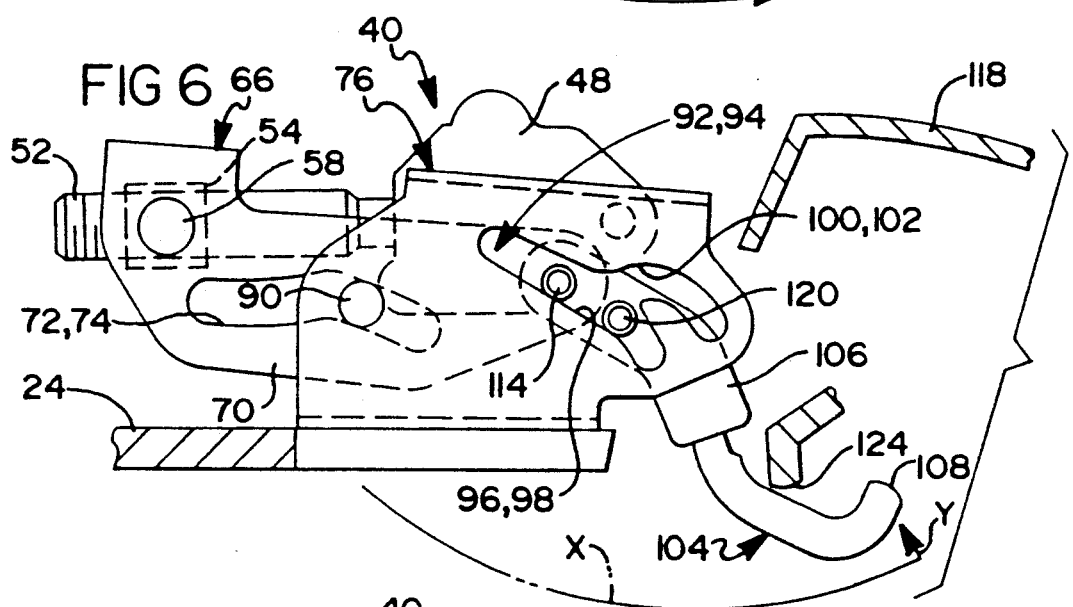
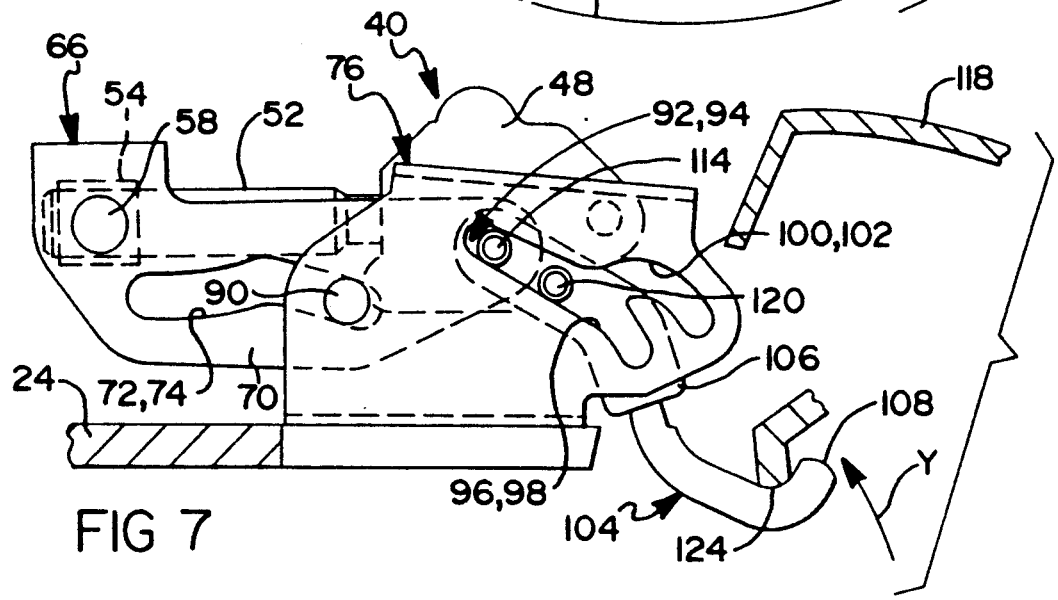

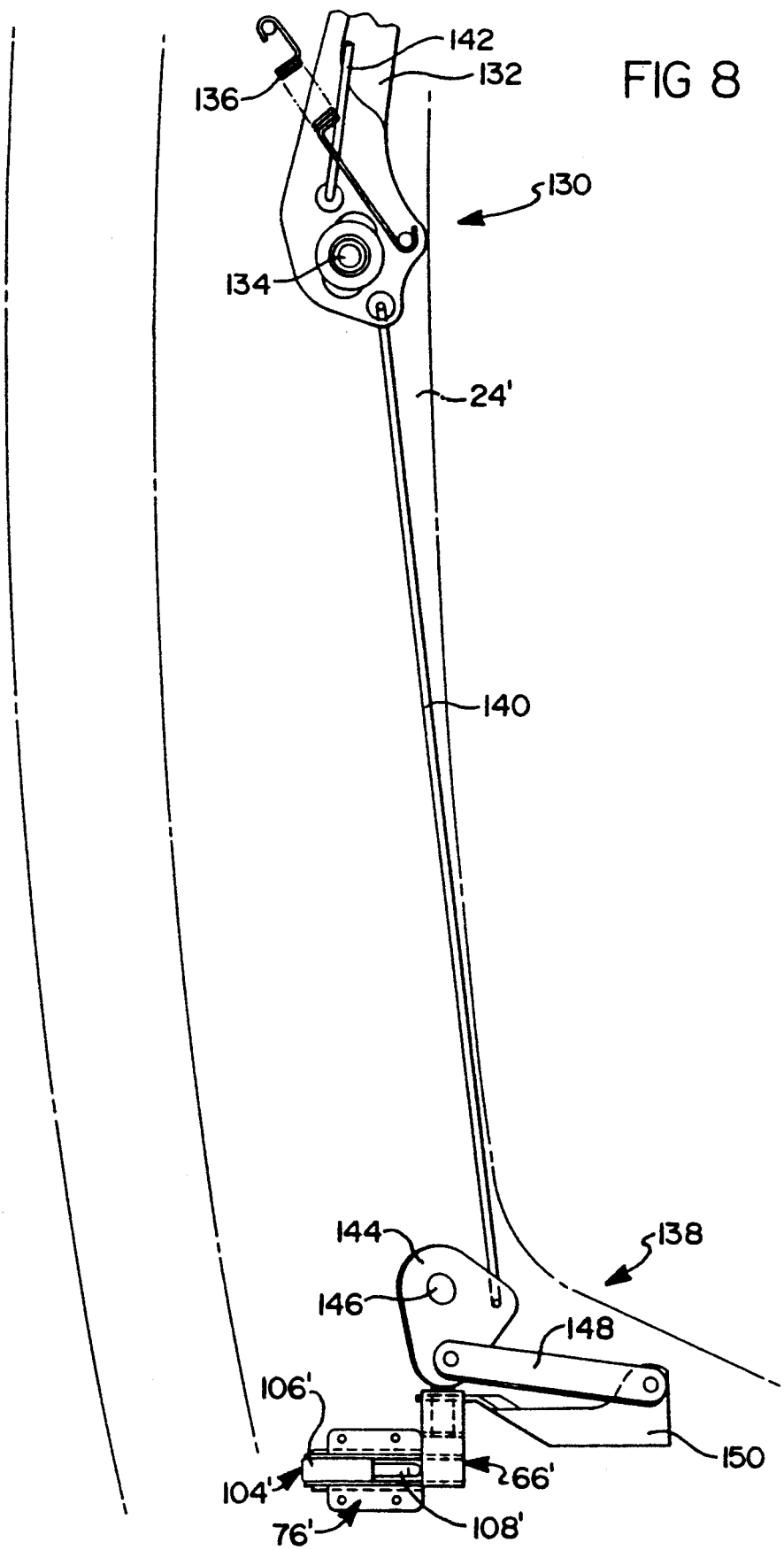

SELF-STORING CONVERTIBLE TOP LATCH SYSTEM

BACKGROUND OF THE INVENTION

This invention relates generally to vehicle convertible tops and, more particularly, to a self-storing latch for latching a convertible top header to a vehicle windshield header.

Vehicles having convertible tops conventionally incorporate a latch at each side of the top header which has a latch hook, commonly called a J-hook. A manual handle is operated to engage the J-hook with a latch surface on the windshield header and withdraw the latch hook into the top header and pull the headers together. The handle is finally moved overcenter to secure the headers in latched position. Such an arrangement is shown in U.S. Pat. No. 3,216,763—Heincelman. Although many other types of side latching arrangements have been developed, the J-hook arrangement is the most widely used.

Side latching arrangement latches employ complex linkages and feature latch hooks or bolts that must be operated separately. This requires either that the driver move to the passenger seat to operate the right side latch or that the passenger operate it. To eliminate this problem, latches have been developed which provide simultaneous operation by a central operator which is easily reached and operated by the driver. Such a latching system is illustrated in U.S. Pat No. 2,500,459—Lundberg et al. However, there is no J-hook latching system currently available which utilizes a single operator for both side latches.

Current latching arrangements of the type shown in Heincelman have their J-hooks and handles projecting from the header when unlatched. In this position, the projecting hooks and handles obstruct top storage and must be re-stored to permit subsequent top storage. This requires that both latch handles be manipulated to withdraw the J-hooks into the header and simultaneously store the operating handles.

It would be desirable to provide a J-hook latch for a convertible top in which the J-hook is self-storing when in unlatched position.

It would also be desirable to provide an operating mechanism which enables both J-hook latches to be operated by a single latch operator which can be manipulated by the vehicle driver without moving from the driver's seat.

SUMMARY OF THE INVENTION

It is therefore an object of this invention to provide a J-hook latch for a convertible top in which the J-hook is self-storing when in unlatched position.

Another object of this invention is to provide an operating mechanism which enables both J-hook latches to be operated by a single latch operator which can be manipulated by the vehicle driver without moving from the driver's seat.

In one aspect, this invention features a latch mechanism for latching a convertible top header to a vehicle windshield header, comprising a latch hook receiver mounted on the windshield header, a movable latch member having a free end mounting a hook, mounting means mounting the latch member on the top header for movement in a compound curvilinear path between an unlatched position, stored within the top header, and a latched position, extending from the top header with the hook engaging the receiver to clamp the headers together, and operating means for moving the latch member between positions.

Preferably, the mounting means include a fixed bracket and cooperating primary pin and slot means, including a drive pin, on the latch member and on the bracket for controlling movement of the hook after engaging the receiver in a predetermined path to draw the top header forwardly and downwardly to engagement with the windshield header; the operating means includes a drive link which mounts the drive pin. The mounting means constrain hook movement by the operating means from an unlatched position, through a segmented path comprising an initial downward, forward, upward arcuate segment into engagement with the receiver, and a terminal rearward segment, to an unlatched position in which the headers are clamped together.

In another aspect, this invention features a latch mechanism for latching a convertible top header to a vehicle windshield header, comprising a latch hook receiver mounted adjacent to each end of the windshield header, a pair of movable latch members each having a free end mounting a hook, a mounting bracket located adjacent to each end of the top header mounting each of the latch members for movement in a compound curvilinear segmented path between an unlatched position, stored within the top header, and a latched position, extending from the top header with the hook engaging a receiver to clamp the headers together, each bracket and its latch member having cooperating primary pin and slot means including a drive pin for controlling movement of the hook after engaging the hook receiver in a predetermined path segment to draw the top header forwardly and downwardly into engagement with the windshield header, and operating means connected to each drive pin for moving both latch members between positions.

In one embodiment of this invention, the operating means comprise a manual operator mounted centrally of the top header, a drive link connected to each latch member drive pin, and linkage means connecting the operator to each drive link including an overcenter device for locking the latch members in a latched position.

In another embodiment of this invention, the operating means comprise an electric motor mounted centrally of the top header, a drive link connected to each latch member drive pin and a power transmission connecting the motor to each drive link.

Preferably, the primary pin and slot means comprise an elongated base slot and an intersecting curvilinear branch slot adjacent to its outer end on each bracket, and a guide pin carried by each latch member and spaced from the drive pin, the guide pin being received within the base slot and the drive pin being received within the branch slot in an unlatched position; the operating means initially pivot the latch members about the guide pins until the drive pins enter the base slots and terminally slide both pins toward the inner ends of the base slots to move the latch members from unlatched to latched positions.

These and further objects and features of this invention will become more readily apparent upon reference to the following detailed description of a preferred embodiment, as illustrated in the accompanying drawings, in which:

BRIEF DESCRIPTION OF THE DRAWINGS

FIG. 5 is an elevation of the latch of FIGS. 3 and 4, illustrating the latch in an unlatched and stored position;

FIG. 6 is a view similar to FIG. 5, illustrating the latch after it has moved to a position initially engaging a windshield header abutment;

FIG. 7 is a view similar to FIG. 6, illustrating the latch after it has moved to a latched position;

FIG. 8 is an enlarged plan view of another portion of a modified, manually-operated top latch system, shown in an unlatched position.

DETAILED DESCRIPTION OF A PREFERRED EMBODIMENT

Figure 1:
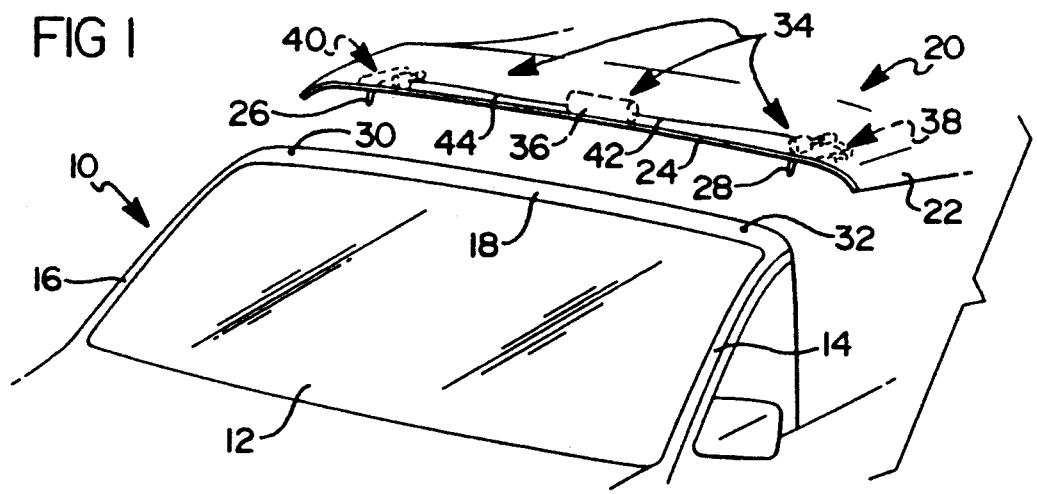
FIG. 1 is a partial perspective view of a convertible vehicle having a power-operated top latch system according to this invention, with the convertible top illustrated partially lowered.
Figure 2:
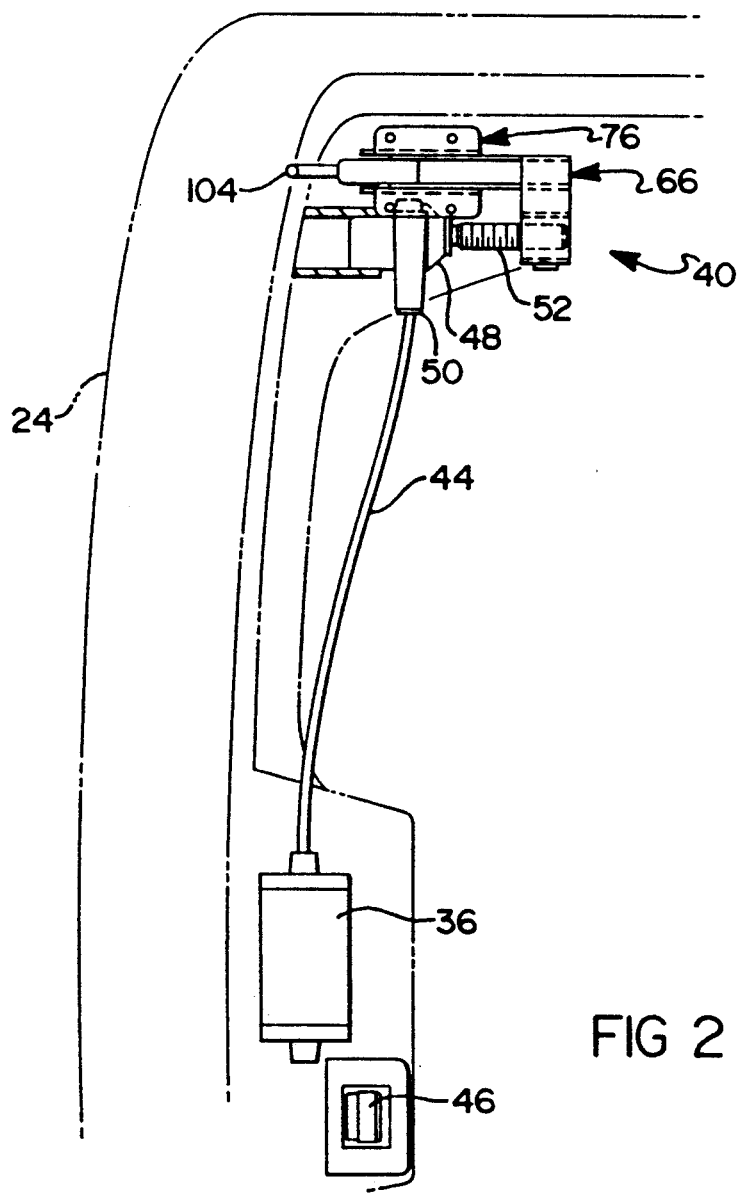
FIG. 2 is an enlarged plan view of a portion of the top latch system of FIG. 1.
Figure 3:
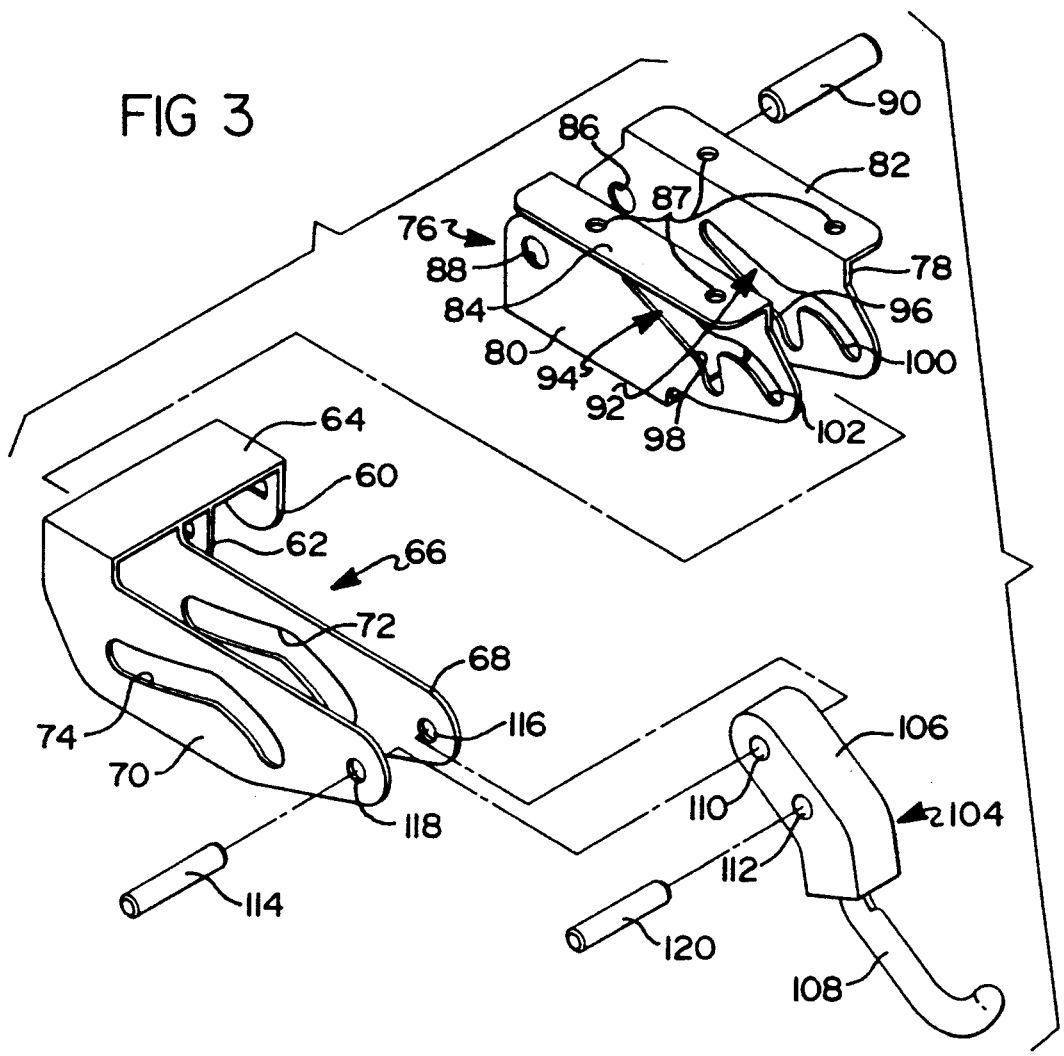
FIG. 3 is an exploded perspective view of one of the top latches, according to this invention.
Figure 4:
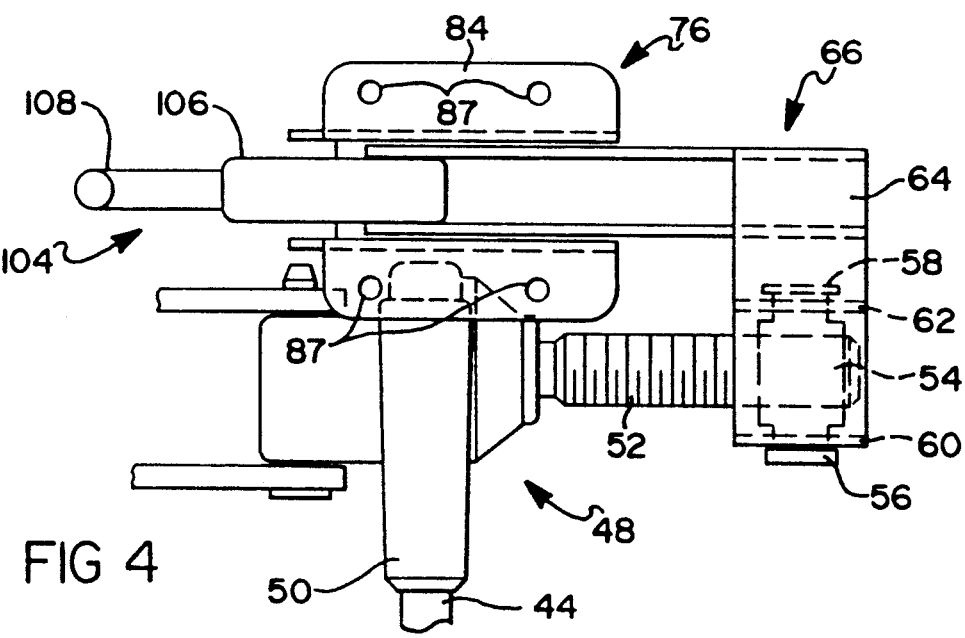
FIG. 4 is a plan view of the latch of FIG. 2.

Referring now to FIG. 1 of the drawings, a convertible vehicle 10 mounts windshield 12 which is framed by A pillars 14 and 16 and windshield header 18. Vehicle 10 has a convertible top 20 which comprises a conventional articulated frame (not shown), that is covered by fabric cover 22, and terminates in top header 24.

Top 20 is raised and lowered manually or by power actuators in a well-known manner. When the top is raised, two spaced probes 26 and 28 mounted on top header 24 are received in locator holes 30 and 32 in windshield header 18 to accurately locate top header 24 relative to windshield header 18. In the convertible top raised position, headers 18 and 24 are latched together by latching system 34, according to this invention.

A power-operated version of the latching system 34 is illustrated in FIGS. 1-7 and includes electric motor 36 mounted centrally on top header 24. Motor 36 is connected to two symmetrically identical latch units 38 and 40 by flexible rotary drive shafts 42 and 44 and is operated by header-mounted switch 46. Since latch units 38 and 40 are symmetrically identical, only right side unit 40 will be described in detail.

Latch unit 40 includes worm gear transmission 48 having input 50, which connects to drive shaft 44, and an output in the form of drive screw 52. Drive nut 54 is threaded onto drive screw 52 and is pivotally attached by pins 56 and 58 which are received by spaced ears 60 and 62 which depend from top flange 64 of drive link 66. A pair of space legs 68 and 70 depend from flange 64 and extend forwardly. A pair of aligned, angled control slots 72 and 74 are formed in legs 68 and 70.

A U-shaped mounting bracket 76 includes spaced upstanding legs 78 and 80 which terminate in turned-out mounting flanges 82 and 84. Four mounting holes 87 are formed in flanges 82 and 84 to receive fasteners which mount bracket 76 on top header 24. Aligned holes 86 and 88 are formed at the rear of legs 78 and 80. Drive link legs 68 and 70 are confined between bracket legs 78 and 80 and a control pin 90 is received through hole 86, slot 72, slot 74 and hole 88 to connect drive link 66 to mounting bracket 76.

Mounting bracket legs 78 and 80 have aligned h-shaped guide slots 92 and 94 formed in them. These slots comprise respective base slots 96 and 98 and intersecting curvilinear branch slots 100 and 102. A latch member 104 comprises a base 106 which mounts a J-shaped latch hook, or "J-hook" 108. Base 106 includes spaced holes 110 and 112.

Drive pin 114 extends through latch member hole 110 and is received in aligned holes 116 and 118 formed in the forward ends of drive link legs 68 and 70. This mounts latch member 104 for movement by drive link 66, while permitting relative pivotal movement. The ends of drive pin 114 is received within mounting bracket guide slots 92 and 94.

Guide pin 120 is received through latch member hole 112 and has its ends received in drive slots 92 and 94 of mounting bracket 76. Latch member 104 is driven fore-and-aft by drive pin 114 on drive link 66. The motion of latch hook 108 during fore-aft movement is controlled by movement of primary pin-and-slot means which comprise drive pin 114 and guide pin 120 in guide slots 92 and 94. The movement of drive link 66 is controlled by secondary pin-and-slot means, which comprise slots 72 and 74 and control pin 90, and by the movement of drive pin 114 in guide slots 92 and 94.

As noted above, latch units 38 and 40 are symmetrically identical. FIG. 1 illustrates top 20 as lifted off windshield header 18 in nearly raised (or partially retracted) position. As top header 24 engages windshield header 18, the latch units will be as depicted in FIG. 5. In this unlatched position, J-hook 108 is stored in a retracted position within header 24. Drive pin 114 is located at the forward end of branch slots 100, 102, and guide pin 120 is located at the forward end of base slots 96, 98.

Operation of switch 46 will actuate motor 36 and rotate drive shaft 44. This will rotate drive screw 52 and move drive link 66 rearwardly which pulls drive pin 114 rearwardly, moving latch member 104 along branch slots 102, 104. As a result, J-hook 108 rotates counterclockwise (as viewed in FIGS. 5-7) through opening 122 in top header 24 through a downward, forward, upward curvilinear segment x of a compound path. The arcuate motion of the front end of drive link 66 is controlled by the movement of drive pin 114 in arcuate branch slots 100, 102, while the motion of its rear end is controlled by the movement of its slots 72, 74 over fixed control pin 90.

At the end of path segment x, drive pin 114 engages the bottom of base slots 96, 98 and further rearward movement of drive link 66 begins retracting J-hook 108 rearwardly, as illustrated in FIG. 6, along segment y of its compound path of travel. Further rearward movement of drive link 66 by drive screw 52 will retract J-hook 108 rearwardly into contact with the lip of a latch hook receiver 124 on windshield header 18, as shown in FIG. 7. Headers 18 and 24 are now firmly clamped together to maintain top 20 in its raised position.

The rearward, upward movement of the tip of J-hook 108 along the y path segment into clamping engagement with receiver 124 is assured by the movement of pins 114 and 120 in the fixed main slots 96, 98. The motion of drive link 66 is also controlled by these pins and by the movement of control slots 72, 74 over fixed pin 90. Of course, the operation of latch unit 38 is identical to that just described.

Lowering of top 20 is accomplished by a reversal of the motions described above. Switch 46 is operated to reverse motor 36, which rotates drive screw 52 to project drive link forwardly. J-hook 108 will then reverse movement along path segments x and y from the FIG. 7 to the FIG. 5 positions. Pins 114 and 120 will move forwardly through base slots 96, 98, while control slots 72, 74 will move over pin 90, until guide pin 120 engages the forward end of base slots 96, 98. Further forward movement of drive link 66 will force drive pin through auxiliary slots 100, 102 and J-hook 108 will rotate clockwise along path segment x through opening 122 to its unlatched position, retracted within header 24. Operation of latch unit 38 is, again, identical.

Thus, with a latch system according to this invention, the vehicle driver need merely operate easily accessible switch 46 to operate latch units 38 and 40 to latch or unlatch top header 24 from windshield header 18. The J-hooks automatically retract into the top header when unlatched so that lowering the top or latching of a raised top can proceed without interruption to re-set the latches, as is now necessary.

Figure 9:
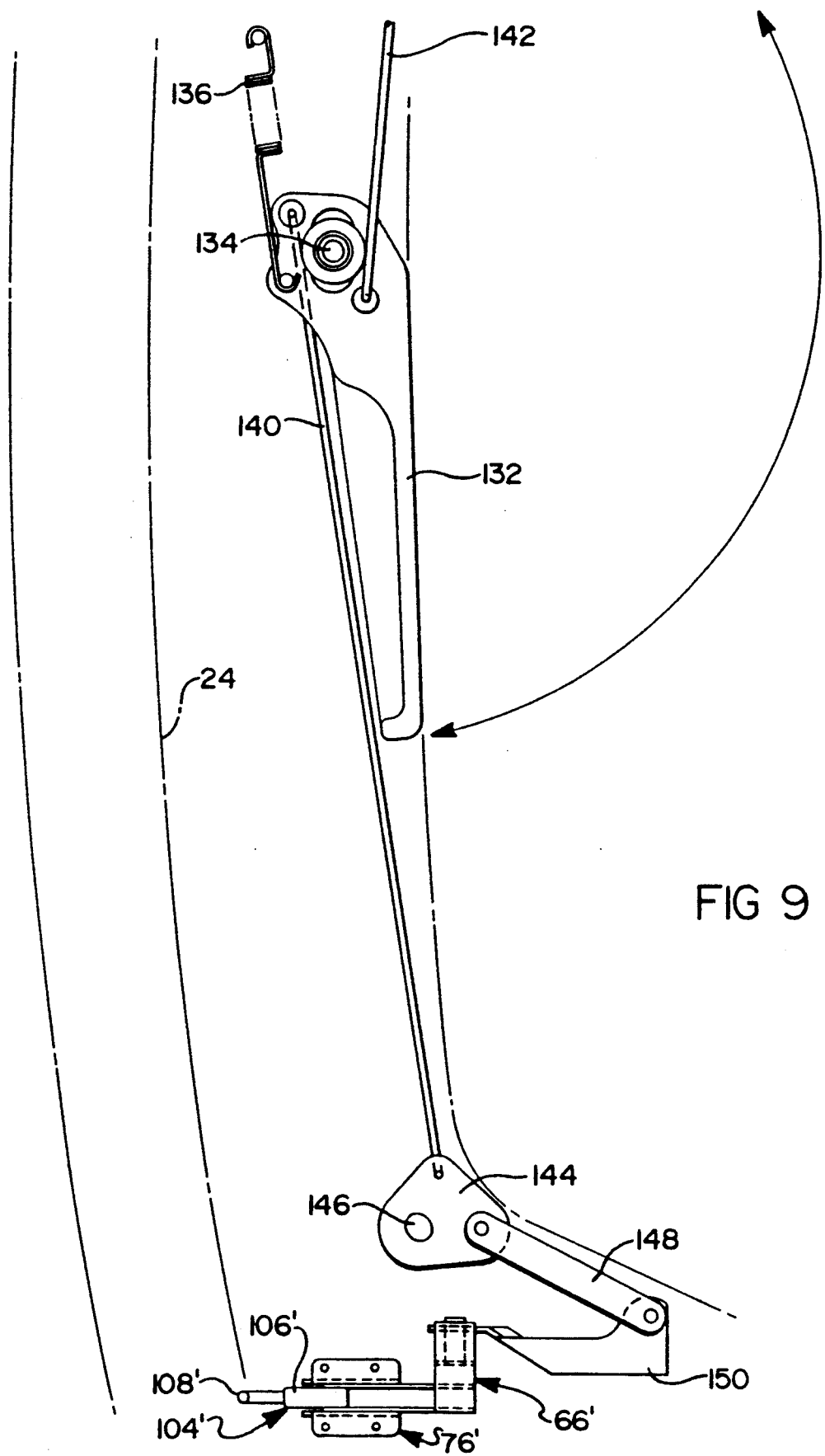
FIG. 9 is a view similar to FIG. 8, with the latch shown in a latched position.

A modification of the latch system of this invention, designated 138, is illustrated in FIGS. 8 and 9. In this modification, the mounting bracket 76, drive link 66 and latch member 104 are identical to those elements described above and are indicated by primed like reference numerals.

Latch system 130 is manually operated and includes a manual handle 132 pivotally mounted at 134 centrally of top header 24'. Handle 132 moves overcenter between an unlatched position, shown in FIG. 8 and a latched position, shown in FIG. 9, and is biased into both positions by a tension spring 136. A drive rod 140 connects handle 132 to a left side latch unit 138. As with the previous embodiment, a symmetrically identical right side latch unit is provided (although not shown) and is connected to handle 132 by a drive rod 142.

Drive rod 140 connects to a bellcrank 144 which is mounted to top header 24' by a pivot pin 146. A connecting link 148 drivingly interconnects bellcrank 144 to a drive transfer link 150 that mounts drive link 66'. Together, bellcrank 144 and links 148 and 150 serve the same function as drive screw 52 and drive nut 54 of the previous embodiment.

Operation of latch system 130 is similar to that of the previously-described embodiment, although manual. Handle 142 is grasped and rotated approximately 180° from the FIG. 8 position to the FIG. 9 position. This will move J-hook 108' from a retracted, unlatched position to a latched position as indicated in FIGS. 5 and 7.

In both the latched and unlatched positions, handle 132 lies within the confines of top header 24'. As with the J-hooks, this self storage of handle 132 in unlatched position facilitates top raising and lowering.

While only a preferred embodiment has been illustrated and described, obvious modifications thereof are contemplated within the scope of this invention and the following claims.

I claim:

1. In a vehicle having a windshield including a header and a convertible top including a header, a latch mechanism for latching the headers together, comprising
a latch hook receiver mounted on the windshield header,
a movable latch member having a free end mounting a hook,
mounting means mounting the latch member on the top header for movement in a compound curvilinear path between an unlatched position, stored within the top header, and a latched position, extending from the top header with the hook engaging the receiver to clamp the headers together, and
operating means for moving the latch member between positions.

2. The latch mechanism of claim wherein the mounting means constrain hook movement by the operating means from an unlatched position to a latched position through a path comprising an initial downward, forward, upward arcuate portion into engagement with the receiver, and a terminal rearward portion to clamp the headers together.

3. The latch mechanism of claim 2, wherein the mounting means include a fixed bracket and cooperating primary pin and slot means on the latch member and on the bracket for controlling movement of the hook after engaging the receiver in a predetermined path to draw the top header forwardly and downwardly into engagement with the windshield header.

4. The latch mechanism of claim 3, wherein the primary pin and slot means include a drive pin and the operating means includes a drive link which mounts the drive pin.

5. The latch mechanism of claim 4, wherein the drive link and the bracket include cooperating secondary pin and slot means spaced from the primary pin and slot means and cooperating therewith to control movement of the drive link.

6. The latch mechanism of claim 2, wherein the mounting means comprise
a bracket mounted on the top header and including primary slot means having an elongated base slot and an intersecting curvilinear branch slot adjacent to its outer end, and
a drive pin carried by the latch member and initially received within the branch slot in the unlatched position and a guide pin carried by the latch member and received within the base slot, wherein
the operating means initially pivot the latch member about the guide pin until the drive pin enters the base slot and terminally slides both pins toward the inner end of the base slot to move the latch member from unlatched to latched positions.

7. The latch mechanism of claim 6, wherein the operating mechanism includes a drive link for the latch member which mounts the drive pin and includes a spaced control slot, and the bracket mounts a control pin received in the control slot to control movement of the drive link.

8. The latch mechanism of claim 7, wherein the operating mechanism includes a power source and the drive link is connected thereto.

9. In a vehicle having a windshield including a header and a convertible top including a header, a latch mechanism for latching the headers together, comprising
a latch hook receiver mounted adjacent each end of the windshield header,
a pair of movable latch members each having a free end mounting a hook,
a mounting bracket located adjacent each end of the top header mounting each of the latch members for movement in a compound curvilinear path between an unlatched position, stored within the top header, and a latched position, extending from the top header with the hook engaging the latch hook receiver to clamp the headers together, each bracket and its latch member having cooperating primary pine and slot means including a drive pin for controlling movement of the hook after engaging the hook receiver in a predetermined path to draw the top header forwardly and downwardly to engagement with the windshield header, and operating means connected to each drive pin for moving both latch members between positions.

10. The latch mechanism of claim 9, wherein the operating means comprise a manual operator mounted centrally of the top header, a drive link connected to each latch member drive pin, and linkage means connecting the operator to each drive link including an overcenter device for locking the latch members in a latched position.

11. The latch mechanism of claim 10, wherein the primary pin and slot means comprise an elongated base slot and an intersecting curvilinear branch slot adjacent its outer end on each bracket, and a guide pin carried by each latch member and spaced from the drive pin, the guide pin being received within the base slot and the drive pin being received within the branch slot in the unlatched position, wherein the operating means initially pivot the latch members about the guide pins until the drive pins enter the base slots and terminally slide both pins toward the inner ends of the base slots to move the latch members from an unlatched to a latched positions.

12. The latch mechanism of claim 11, wherein the operating means include a drive link for each latch member which mounts the drive pin and includes a spaced control slot, and each bracket mounts a control pin received in the control slot to control movement of the drive link.

13. The latch mechanism of claim 9, wherein the operating means comprise an electric motor mounted centrally of the top header, a drive link connected to each latch member drive pin, a power transmission connecting the motor to each drive link.

14. The latch mechanism of claim 13, wherein the primary pin and slot means comprise an elongated base slot and an intersecting curvilinear branch slot adjacent its outer end on each bracket, and a guide pin carried by each latch member and spaced from the drive pin, the guide pin being received within the base slot and the drive pin being received within the branch slot in an unlatched position, wherein the operating means initially pivot the latch members about the guide pins until the drive pins enter the base slots and terminally slide both pins toward the inner ends of the base slots to move the latch members from unlatched to latched positions.

15. The latch mechanism of claim 14, wherein the operating means include a drive link for each latch member which mounts the drive pin and includes a spaced control slot, each bracket mounts a control pin received in the control slot to control movement of the drive link, and each power transmission includes an output shaft connected to the drive link.

* * * * *